United States Patent Office 3,410,574
Patented Nov. 12, 1968

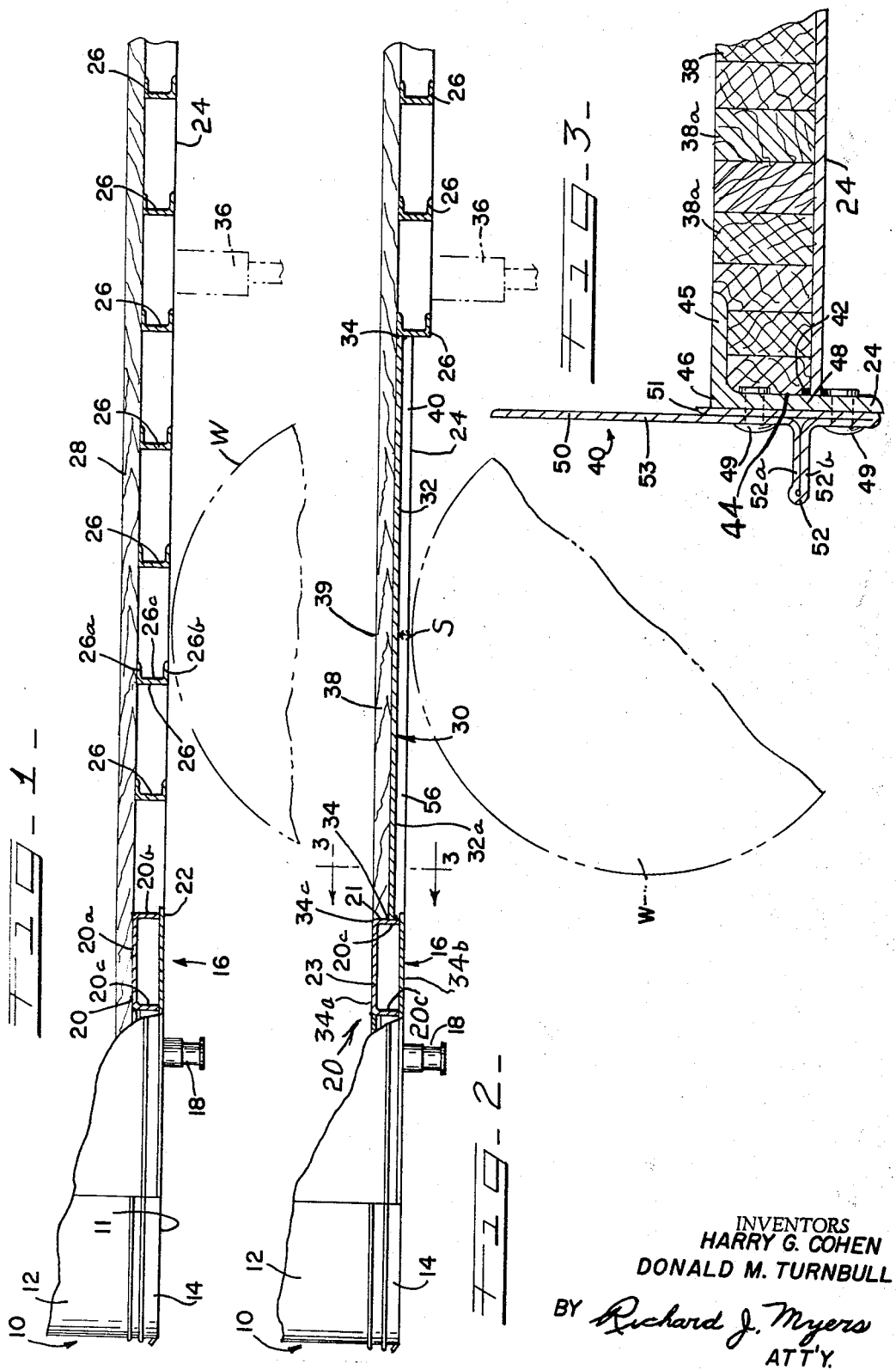

3,410,574
VEHICLE FLOOR SUPPORT
Harry G. Cohen and Donald M. Turnbull, Cincinnati, Ohio, assignors to Pullman Incorporated, Chicago, Ill., a corporation of Delaware
Filed Sept. 19, 1966, Ser. No. 580,243
14 Claims. (Cl. 280—106)

ABSTRACT OF THE DISCLOSURE

A trailer vehicle underframe construction comprising an upper fifth wheel assembly portion, an intermediate underframe portion, and side body rail portions, and a floor support comprising a horizontal plate member having integral attachment with the side body rail portions, with the fifth wheel assembly and the intermediate underframe portion, the plate member being above the bottom of the fifth wheel assembly and below the floor of the vehicle.

---

This invention relates to a vehicle floor construction and more in particular relates to a trailer vehicle diaphragm type floor support for a vehicle between the trailer vehicle fifth wheel assembly and its landing gear assembly. High inside trailer cube or volume is an important factor in selling trailers. To increase the inside cube over that of standard trailers, the roof of the trailer cannot be raised, due to overall height limitations, and, therefore, the floor must be lowered. This invention pertains to a diaphragm type floor support between the fifth wheel and the landing gear area which allows the vehicle floor, such as wood floor boards, to cover the plate which is to the rear of the fifth wheel and provides more tractor tire clearance and the elimination of additional load bearing members. This invention contemplates a floor construction that utilizes the strength of the upper fifth wheel, the landing gear mounting members and the side body rails and securely anchors the diaphragm plate around the perimeter to the underframe structure with the floor (such as a wood floor) fastened to the diaphragm plate. Such an inventive floor support construction permits the supporting of maximum capacity lift truck loads heretofore not contemplated to an extent of at least 1½ as great as heretofore.

It is therefore a general object of this invention to provide for an improved floor design wherein the floor is supported by a thin plate between the fifth wheel structure and the landing gear area.

A further object of this invention is to provide an improved floor support construction in the front of the trailer whereby the trailer is adapted to handle increased lift truck axle loads to an extent of approximately 1½ times as great, or more, as heretofore.

Still another object of this invention is to supply a floor support construction between the trailer fifth wheel, landing gear area and body side rails, which floor construction provides more tractor clearance and eliminates additional load bearing members and wherein the strength of the upper fifth wheel landing gear body member and side body rails is utilized to support maximum capacity lift truck loads. These and other objects of the invention will become apparent with reference to the following materials and drawings:

FIG. 1 is a side elevational view illustrative of the floor support arrangement found in the prior art;

FIG. 2 is a side elevational view of the novel floor support arrangement of the invention;

FIG. 3 is a view taken along line 3—3 of FIG. 2.

With reference now to FIG. 1, there is shown a portion of a lower front portion of a trailer body 10 of the general type of trailer design as shown, for instance, in U.S. Patent No. 2,841,415 to J. J. Black, dated July 1, 1958. In the Black patent it is seen that there is a semitrailer provided with a forwardly disposed upper fifth wheel structure, a landing gear and bogie support underframe structure with the trailer being rearwardly supported by trailer wheels and the underframe carrying a cargo van body or container arrangement. This invention deals with the construction of the floor support between the upper fifth wheel structure and the landing gear. As shown in FIG. 1, this particular area of the trailer is so constructed as having a forward nose panel section 12, the bottom 11 of which surrounds the pick-up plate assembly 14 which is disposed forwardly of the upper fifth wheel assembly 16 provided with a kingpin 18 on cross member means 20 having web section 20a and flanges 20b and 20c supported on a bottom plate 22. The sides of the pick-up plate assembly 14 and the upper fifth wheel assembly 16 are flanked by the usual side body rails 24, and rearwardly of the upper fifth wheel assembly 16 and between the side body rails 24 is provided a plurality of cross members 26. The cross members or cross bearers 26 extend transversely of the trailer vehicle 10 having horizontal flanges 26a and 26b and a web 26c. Supported on the upper fifth wheel assembly 16 and the cross bearers 26 and extending longitudinally of the trailer is the floor 28 which, in this instance, is made of a series of strips of wood that extend longitudinally and generally the length of the trailer and between the body rails.

Turning now to FIG. 2, it is seen that there is provided a similar type of trailer floor construction shown in FIG. 1 but that the construction and arrangement of the floor portions have been altered. Specifically, the construction of the upper fifth wheel assembly 16 is unchanged over that shown in FIG. 2 but attached to the upper fifth wheel assembly is a longitudinally extending floor support or diaphragm type floor support 30 which comprises a thin horizontally disposed plate member 32 having its forward end 34 welded to the upright flange 20c of the fifth wheel assembly 16 intermediate the upper and lower portions 34a, 34b of said cross member 20 and extends rearwardly where it is integrated or welded with the first cross bearer member 26 by welding, as indicated at 34, the attachment of the plate assembly 30 to the cross bearer 26 being in the vicinity of the landing gear 36 (which is shown in phantom line), whereas in FIG. 1 it is noted the cross members begin more forwardly adjacent the fifth wheel assembly.

The floor 38 which, in this instance, is made of wooden slats 38a (see FIGS. 2 and 3) extending longitudinally of the vehicle, is supported by the plate 30 between the upper rear surface 21 of the flange 20b of the channel member 20 of assembly 16, the top surface 39 of the wooden floor 38 lying in the same plane as the top surface 23 of the horizontal web 20a of the channel section 20 of the assembly 16. The plate 30, as seen in FIG. 3, is attached to each side body rail 40 by welding, as indicated at 42 and the side edges 44 of the floor 38 are sandwiched between the diaphragm steel plate 30 and the flange 46 of angle plate portion 45 of the body rail 40 and the upper flange portion 48 of the body rail. The body rail 24 is composed of the angle plate 45 which has the horizontal flange 46 and the vertical flange 48 which is held to the outside body rail portion 50 (by rivets 49) which consists of a strip of metal bent over on itself and having sections 51, exterior post flange section 52 having lapped portions 52a and 52b and upper post flange portion 53. The wooden floor 38 has its rearward portions carried atop the cross beams or bearers 26 with the floor 38 extending to the rear portions of the trailer in such fashion. The floor plate 30 is of thin vertical cross section to provide for an underside clearance space 56 allowing the side body rails on either side of the diaphragm plate to extend below the plate 30 in skirt fashion and permit a sufficient amount of clearance space S between the tractor wheel W (shown in phantom) and the underside of the plate 30 which clearance is not possible with the arrangement as shown in FIG. 1 where the wheel W may very well rub against the underside of the cross bearers 26. It is noted in FIG. 2 that cross bearers 26 are not over the wheel W but located rearwardly thereof.

Thus it is seen that there is provided a trailer which has an inside cube dimension that is greater, as shown in FIG. 2, compared to the construction shown in FIG. 1, because the wooden floor is flush with the top surface of the upper fifth wheel assembly. Further, a greater tractor tire clearance is provided in the construction as shown in FIG. 2 from that shown in FIG. 1 because the plate undersurface 32a is sufficiently above the tractor tire. This increased clearance is provided between the fifth wheel, the landing gear area and the side body rails of the vehicle with the elimination of additional load bearing members which are now not necessary. Such an arrangement provides for an increased load capacity which can be at least 1½ times greater and can support 1½ times greater truck axle loads than heretofore.

With reference to FIG. 2, although the rear portion of the plate 30 is attached to the leading cross bearer 24 where the landing gear unit is located and, therefore, the rear portion of the plate 30 is attached to that part of the underframe in the general area of the landing gear, it will be appreciated that there may not be any landing gear arrangement 36 attached at this point, that is, at the intermediate underframe portion and still be within the intent and scope of the invention and, therefore, it should be understood that such terms as "landing gear area" or "intermediate underframe portion" refer to that part of the underframe that is adjacent the rear portion of the plate 30.

While the embodiment of the invention has been shown and described above, it will be understood the specific structural details disclosed are merely by way of illustration and the invention may take other forms within the scope of the appended claims.

What is claimed is:

1. A floor support arrangement for a trailer vehicle having an upper fifth wheel assembly and a landing gear area, said floor support comprising a generally horizontal plate member having integral attachment with the side body rails of the vehicle and with the fifth wheel assembly and the landing gear area, and a floor carried on said plate member and having an upper horizontal surface lying generally in the plane of the upper portion of the fifth wheel assembly, said plate member having a lower surface extending above the lower surfaces of said body rail wherein the cube capacity of the trailer is increased and the clearance of the trailer with respect to the associated tractor vehicle wheel is increased.

2. A floor support arrangement for a trailer vehicle having an upper fifth wheel assembly and an intermediate underframe portion, said floor support comprising a plate member having attachment with the side body rails of the vehicle and with the forward fifth wheel assembly and the intermediate underframe portion, and a floor carried on said plate member and having an upper surface lying generally in the plane of the upper portion of the fifth wheel assembly, said plate member having a lower surface extending above the lower surfaces of said body rail wherein the volumetric capacity of the trailer is increased and the clearance of the trailer with respect to the associated tractor vehicle wheel is increased.

3. A floor support arrangement for a trailer vehicle having an underframe comprising an upper fifth wheel assembly portion and an intermediate underframe portion and side body rail portions, said floor support comprising a horizontal plate member having integral attachment with the side body rails of the vehicle and with the fifth wheel assembly and with the intermediate underframe portion, and floor means being supported on said plate member having an upper surface generally flush with the upper surface of the fifth wheel assembly portion and extending above the intermediate underframe portion.

4. The invention according to claim 3 and said intermediate portion comprising the landing gear area.

5. The invention according to claim 4 and said landing gear area including a plurality of transverse cross bearers and said plate member being attached to the most forward of these cross bearers the surfaces of which extend below the lower surface of the plate member.

6. The invention according to claim 3 and said plate member having an upper floor supporting surface lying generally below the plane of the upper portion of the fifth wheel assembly portion wherein the volumetric capacity of the trailer is increased.

7. The invention according to claim 3 and said plate member having a lower surface extending above the lower surface of said body underframe wherein the clearance of the trailer with respect to the associated tractor vehicle wheel means is increased.

8. A floor support arrangement for a trailer vehicle having an underframe comprising an upper fifth wheel assembly portion and an intermediate underframe portion and side body rail portions, said floor support comprising a horizontal plate member having integral attachment with the side body rails of the vehicle and with the fifth wheel assembly and with the intermediate underframe portion, said plate member having an upper floor supporting surface lying generally below the plane of the upper portion of the fifth wheel assembly portion and having a lower surface extending above the lower surfaces of said body underframe wherein the volumetric capacity of the trailer is increased and the clearance of the trailer with respect to the associated vehicle wheel means is increased.

9. A trailer vehicle underframe construction comprising an upper fifth wheel assembly portion, an intermediate underframe portion, and side body rail portions, and a floor support comprising a horizontal plate member having integral attachment with the side body rail portions, with the fifth wheel assembly and the intermediate underframe portion, and said plate member having an upper floor supporting surface lying generally below the plane of the upper portion of the fifth wheel assembly portion wherein the cube capacity of the trailer is increased.

10. A trailer vehicle underframe construction comprising an upper fifth wheel assembly portion, an intermediate underframe portion, and side body rail portions, and a floor support comprising a horizontal plate member having integral attachment with the side body rail portions, with the fifth wheel assembly and the intermediate underframe portion, and said plate member having a lower surface extending above the lower surface of said body underframe wherein the clearance of the trailer with respect to the associated tractor vehicle wheel means is increased.

11. A trailer vehicle underframe construction comprising an upper fifth wheel assembly portion, an intermediate underframe portion, and side body rail portions, and a floor support comprising a horizontal plate member having integral attachment with the side body rail portions, with the fifth wheel assembly and the intermediate underframe portion, and said plate having an upper floor supporting surface lying generally below the plane of the upper portion of the fifth wheel assembly portion and having a lower surface extending above the lower surfaces of said body underframe wherein the cube capacity of the trailer is increased and the clearance of the trailer with respect to the associated vehicle wheel means is increased.

12. A trailer vehicle underframe construction comprising an upper fifth wheel assembly portion, an intermediate underframe portion, and side body rail portions, and a floor support comprising a horizontal plate member having integral attachment with the side body rail portions, with the fifth wheel assembly and the intermediate underframe portion, and said intermediate portion comprising the landing gear area.

13. The invention according to claim 12 and said landing gear area including a plurality of transverse cross bearers and said plate member being attached to the most forward of these cross bearers the surfaces of which extend below the lower surface of the plate member.

14. A trailer vehicle underframe construction comprising an upper fifth wheel assembly portion, an intermediate underframe portion, and side body rail portions, and a floor support comprising a horizontal plate member having integral attachment with the side body rail portions, with the fifth wheel assembly and the intermediate underframe portion, and floor means being supported on said plate member having an upper surface generally flush with the upper surface of the fifth wheel assembly portion and extending above the intermediate underframe portion.

References Cited

UNITED STATES PATENTS

| | | | |
|---|---|---|---|
| 3,185,519 | 5/1965 | Turnbull | 296—28.2 |
| 2,872,240 | 2/1959 | Bennett | 296—28.2 |
| 2,743,940 | 5/1956 | Bohlen | 280—106 |
| 2,621,059 | 12/1952 | Ridgway | 280—106 |
| 2,441,106 | 5/1948 | Theriault | 280—106 |

PHILIP GOODMAN, *Primary Examiner.*